United States Patent
Midorikawa

(10) Patent No.: US 11,689,807 B2
(45) Date of Patent: Jun. 27, 2023

(54) IMAGE CAPTURE APPARATUS, METHOD FOR CONTROLLING THE SAME, AND STORAGE MEDIUM FOR IMPROVING AN OPERATION OF MOVING A FOCAL POINT DETECTION REGION

(71) Applicant: CANON KABUSHIKI KAISHA, Tokyo (JP)

(72) Inventor: Kentarou Midorikawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1 day.

(21) Appl. No.: 16/832,585

(22) Filed: Mar. 27, 2020

(65) Prior Publication Data

US 2020/0322541 A1    Oct. 8, 2020

(30) Foreign Application Priority Data

Apr. 4, 2019 (JP) .............................. JP2019-072164
Dec. 27, 2019 (JP) .............................. JP2019-239285

(51) Int. Cl.
*H04N 23/67* (2023.01)
*H04N 23/63* (2023.01)

(52) U.S. Cl.
CPC ......... *H04N 23/675* (2023.01); *H04N 23/632* (2023.01); *H04N 23/635* (2023.01); *H04N 23/671* (2023.01)

(58) Field of Classification Search
CPC .. H04N 23/675; H04N 23/632; H04N 23/635; H04N 23/671; H04N 23/667; H04N 23/62; H04N 23/631; H04N 23/663; H04N 23/672; H04N 23/673
See application file for complete search history.

(56) References Cited

U.S. PATENT DOCUMENTS 5,832,323 A * 11/1998 Goto ..................... G03B 17/00
                                                             396/297
7,239,304 B2 * 7/2007 Hoshino ............... G06F 3/0421
                                                             345/157
(Continued)

FOREIGN PATENT DOCUMENTS

CN    101547314 A    9/2009
CN    106060373 A    10/2016
(Continued)

OTHER PUBLICATIONS

Partial European Search Report issued by the European Patent Office dated Jul. 22, 2020 in corresponding EP Patent Application No. 20163145.4.
(Continued)

*Primary Examiner* — Quan Pham
(74) *Attorney, Agent, or Firm* — Carter, DeLuca & Farrell LLP

(57) ABSTRACT

An image capturing apparatus comprises an operation device according to which a focal point detection region on a screen can be moved through a movement operation performed by a user; and a control unit configured to perform control such that a movement amount of the focal point detection region on the screen with respect to an operation amount of the operation device is changed according to a shooting state.

7 Claims, 7 Drawing Sheets

(56) References Cited

U.S. PATENT DOCUMENTS

| | | | |
|---|---|---|---|
| 2006/0181517 A1* | 8/2006 | Zadesky | G06F 3/0362 |
| | | | 345/173 |
| 2010/0134676 A1* | 6/2010 | Miyanishi | H04N 23/62 |
| | | | 348/E5.022 |
| 2011/0194018 A1 | 8/2011 | Kosaka | |
| 2016/0373660 A1 | 12/2016 | Saito | |
| 2017/0195552 A1 | 7/2017 | Saito | |
| 2018/0198985 A1 | 7/2018 | Ishitsuka | |
| 2018/0220062 A1* | 8/2018 | Funatsu | H04N 5/23212 |
| 2018/0234621 A1* | 8/2018 | Oyama | H04N 23/62 |

FOREIGN PATENT DOCUMENTS

| | | |
|---|---|---|
| CN | 108377329 A | 8/2018 |
| JP | 2008275732 A | 11/2008 |
| JP | 2012203143 A | 10/2012 |
| JP | 2016163279 A | 9/2016 |

OTHER PUBLICATIONS

Notification of the First Office Action issued by the China National Intellectual Property Administration dated Nov. 9, 2021 in corresponding CN Patent Application No. 202010245764.2, with English language translation.

* cited by examiner

IMAGE CAPTURE APPARATUS, METHOD FOR CONTROLLING THE SAME, AND STORAGE MEDIUM FOR IMPROVING AN OPERATION OF MOVING A FOCAL POINT DETECTION REGION

BACKGROUND OF THE INVENTION

Field of the Invention

The present invention relates to a technique for improving operability of an operation of moving a focal point detection region in an image capture apparatus.

Description of the Related Art

Conventionally, when shooting is performed using a camera, there are cases where shooting is performed while viewing an image on a display unit on a rear surface of the camera (hereinafter called "live view shooting"), and there are cases where shooting is performed while looking through a finder (hereinafter called "finder shooting"). When there are two shooting methods in this manner, if the function provided by the camera is different for each method, the operation reception condition of the operation member is changed in some cases.

For example, Japanese Patent Laid-Open No. 2008-275732 discloses a method in which the effective operation members are switched for live view shooting and for finder shooting.

However, with the technique disclosed in Japanese Patent Laid-Open No. 2008-275732 above, the operation member is switched on and off depending on whether live view shooting is performed or finder shooting is performed. For this reason, for example, when a function of selecting a focal point detection region is allocated to a certain operation member, the focal point detection region cannot be selected using the same operation member in both the case of performing live view shooting and the case of performing finder shooting. This gives the user a feeling of discomfort during use.

Also, when the same function is allocated to the same operation member in the two shooting methods, the following problem occurs. For example, similarly to the above-described case, when selection of a focal point detection region is performed using a certain operation member, in live view shooting, the user can perform the operation while viewing the movement of his or her finger, and therefore an accurate selection operation is possible. On the other hand, in finder shooting, the user cannot view the movement of his or her finger, and therefore the movement of the finger is less accurate compared to that in live view shooting. For this reason, when an algorithm premised on live view shooting is applied to the operation member, the user cannot perform an operation as intended when performing finder shooting.

SUMMARY OF THE INVENTION

The present invention was achieved in view of the foregoing problems, and realizes favorable operability of an operation for moving a focal point detection region in both live view shooting and finder shooting.

According to a first aspect of the present invention, there is provided an image capturing apparatus comprising: an operation device according to which a focal point detection region on a screen can be moved through a movement operation performed by a user; and at least one processor or circuit configured to function as: a control unit configured to perform control such that a movement amount of the focal point detection region on the screen with respect to an operation amount of the operation device is changed according to a shooting state.

According to a second aspect of the present invention, there is provided an image capture apparatus control method for controlling an image capture apparatus including operation device according to which a focal point detection region on a screen can be moved through a movement operation performed by a user, the method comprising: performing control such that a movement amount of the focal point detection region on the screen with respect to an operation amount of the operation device is changed according to a shooting state.

Further features of the invention will become apparent from the following description of exemplary embodiments with reference to the attached drawings.

DESCRIPTION OF THE EMBODIMENTS

Figure 1A:
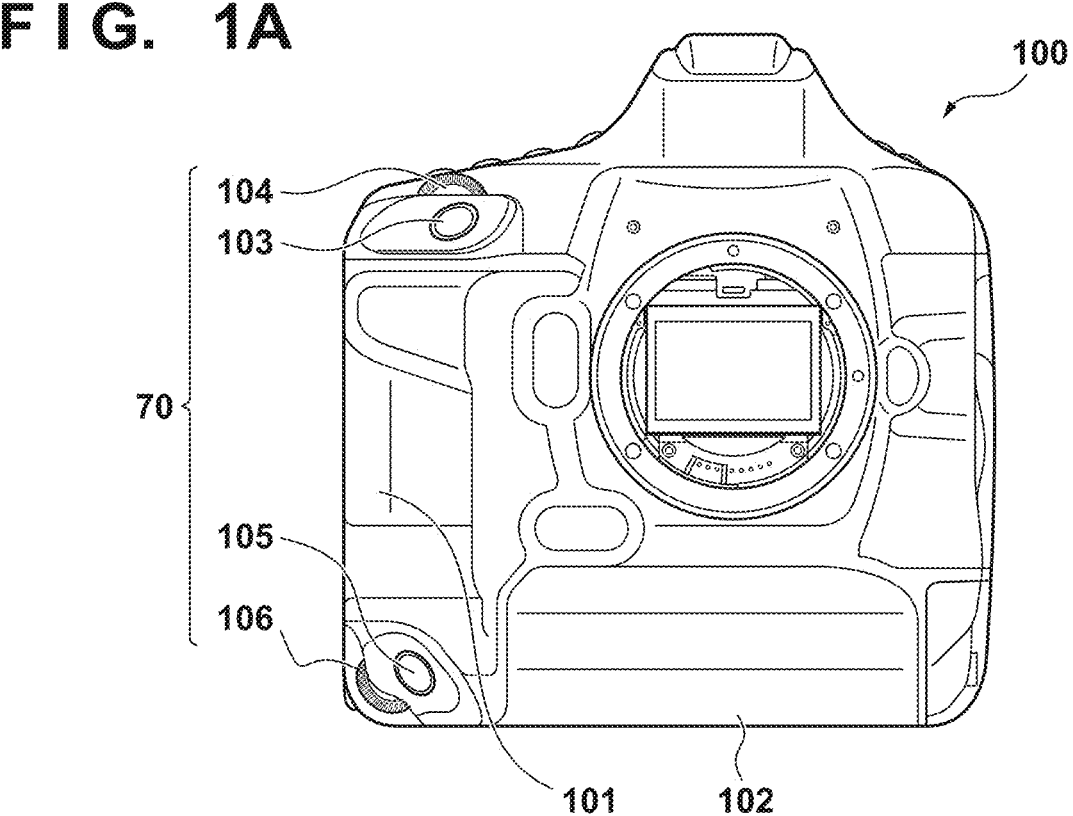
FIGS. 1A and 1B are perspective views showing a single-lens digital camera, which is a first embodiment of the image capture apparatus of the present invention.

Hereinafter, embodiments will be described in detail with reference to the attached drawings. Note, the following embodiments are not intended to limit the scope of the claimed invention. Multiple features are described in the embodiments, but limitation is not made, and an invention that requires all such features, and multiple such features may be combined as appropriate. Each of the embodiments of the present invention described below can be implemented solely or as a combination of a plurality of the embodiments or features thereof where necessary or where the combination of elements or features from individual embodiments in a single embodiment is beneficial. Furthermore, in the attached drawings, the same reference numerals are given to the same or similar configurations, and redundant description thereof is omitted.

First Embodiment

Figure 1B:
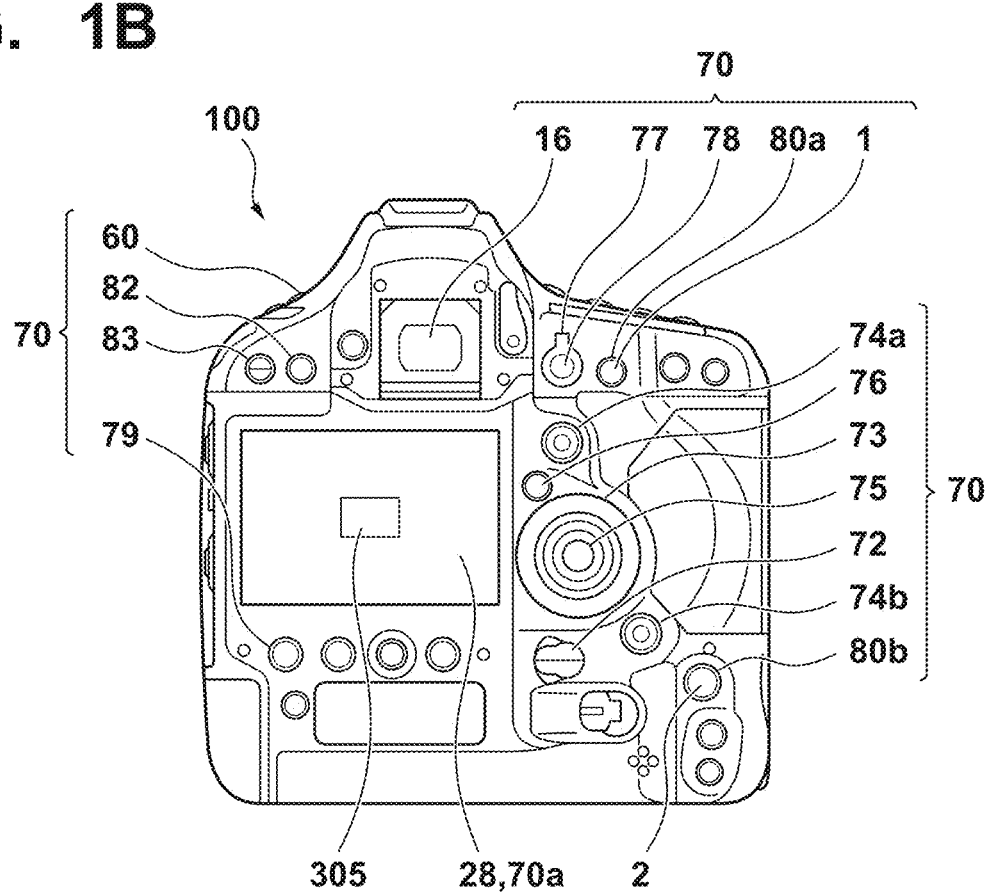

FIGS. 1A and 1B are perspective views showing a single-lens reflex digital camera (hereinafter called a "camera") 100, which is a first embodiment of an image capture apparatus of the present invention. Specifically, FIG. 1A is a view of the camera 100 from the front surface side, and shows a state in which a shooting lens unit has been removed. FIG. 1B is a view of the single-lens reflex camera 100 from the rear surface side.

In FIG. 1A, a first grip portion 101 that protrudes forward is provided on the camera 100 such that a user can stably grip and operate the camera 100 during shooting in a horizontal position. Also, a second grip portion 102 that protrudes forward is provided on the camera 100 such that the user can stably grip and operate the camera 100 during shooting in a vertical position. Shutter buttons 103 and 105 are operation members for performing shooting instructions.

Main electronic dials 104 and 106 are rotation operation members, and it is possible to perform a change of setting values such as the shutter speed and aperture, and the like by rotating the main electronic dials 104 and 106. The shutter buttons 103 and 105 and the main electronic dials 104 and 106 are included in a switch portion 70. The shutter button 103 and the main electronic dial 104 can mainly be used for horizontal position shooting, and the shutter button 105 and the main electronic dial 106 can mainly be used for vertical position shooting.

In FIG. 1B, a display unit 28 is a display unit that can display an image and various types of information. The display unit 28 is provided overlapping with or integrated with a touch panel 70a that can receive a touch operation (touch detection).

An optical tracking pointer 1 and an optical tracking pointer 2 (hereinafter, an optical tracking pointer will be referred to as an "OTP") are touch operation members (in the present embodiment, infrared light sensors) that can receive touch operations. While the user views through the finder, the user can perform a touch operation and a slide operation (movement operation) in any two-dimensional direction with the thumb of his or her right hand on the OTP 1 when gripping the first grip portion 101 or on the OTP 2 when gripping the second grip portion 102. The OTP 1 can mainly be used for horizontal position shooting and the OTP 2 can mainly be used for vertical position shooting. Also, the OTP 1 is incorporated in an AF-ON button 80a and the OTP 2 is incorporated in an AF-ON button 80b such that the user can grip the first grip portion 101 or the second grip portion 102 and immediately start AF (auto-focus) while performing a touch operation or a slide operation.

OTP 1 and OTP 2 are operation members that are different from the touch panel 70a and do not include a display function. The user operating the camera 100 can move the position of a focal point detection frame 305 displayed on the screen of the display unit 28 by operating the OTP 1 or the OTP 2. Note that the object that is moved by operating the OTP 1 or the OTP 2 may be anything and need not be an identical object, as long as it can be displayed on the display unit 28 and can be moved.

A mode-switching switch 60 is an operation member for switching between various modes. Note that with the camera 100 of the present embodiment, focal point detection can be performed using multiple focal point detection methods with different numbers of arrangements of a focal point detection region (focal point detection frame), and the mode-switching switch 60 also performs switching of the focal point detection method. Furthermore, it is also possible to perform focal point detection using multiple focal point detection methods with different ranges in which the focal point detection region is arranged, and the mode-switching switch 60 also performs switching of the focal point detection method.

A power switch 72 is an operation member for switching the power source of the camera 100 on and off. A sub-electronic dial 73 is a rotation operation member for performing movement of a selection frame, image feeding, and the like. Eight-direction keys 74a and 74b are operation members whose upper, lower, left, right, upper left, lower left, upper right, and lower right portions can be pressed, and it is possible to perform operations corresponding to the pressed directions of the eight-direction keys 74a and 74b. The eight-direction key 74a can mainly be used for horizontal position shooting, and the eight-direction key 74b can mainly be used for vertical position shooting. A SET button 75 is an operation member that is mainly used for determination of a selection item or the like. A still image/moving image switching switch 77 is an operation member for switching between a still image shooting mode and a moving image shooting mode.

An LV button 78 is an operation member for switching live view (hereinafter, LV) on and off. A reproduction button 79 is an operation member for switching between a shooting mode (shooting screen) and a reproduction mode (reproduction screen). A Q button 76 is an operation member for performing quick settings, and when the Q button 76 is pressed on the shooting screen, a list of setting values is displayed, a setting item can be selected, and when a setting item is furthermore selected, a transition can be made to a setting screen for the setting items. Due to the reproduction button 79 being pressed in the shooting mode, the reproduction mode can be transitioned to, and the newest of the images recorded in a recording medium 200 (see FIG. 2) can be displayed on the display unit 28.

The switch unit 70 includes the mode-switching switch 60, the power switch 72, the sub-electronic dial 73, the eight-direction keys 74a and 74b, the SET button 75, the Q button 76, the still image/moving image switching switch 77, the LV button 78, and the reproduction button 79. AF-ON buttons 80a and 80b are operation members for starting AF, and are included in the switch unit 70. The AF-ON button 80a can mainly be used for horizontal position shooting and the AF-ON button 80b can mainly be used for vertical position shooting.

A menu button 81 is included in the switch unit 70 and is an operation member for performing various settings of the camera 100. When the menu button 81 is pressed, a menu screen on which various settings can be performed is displayed on the display unit 28. The user can intuitively perform various settings using the menu screen displayed on the display unit 28, and the sub-electronic dial 73, the eight-direction keys 74a and 74b, the SET button 75, and the main electronic dials 104 and 106.

An eyepiece finder 16 is a look-in finder through which a subject can be observed, the finder being for checking the focal point and composition of an optical image of a subject obtained through the lens unit. An INFO button 82 is included in the switch unit 70 and can display various types of information of the camera 100 on the display unit 28.

Figure 6A:
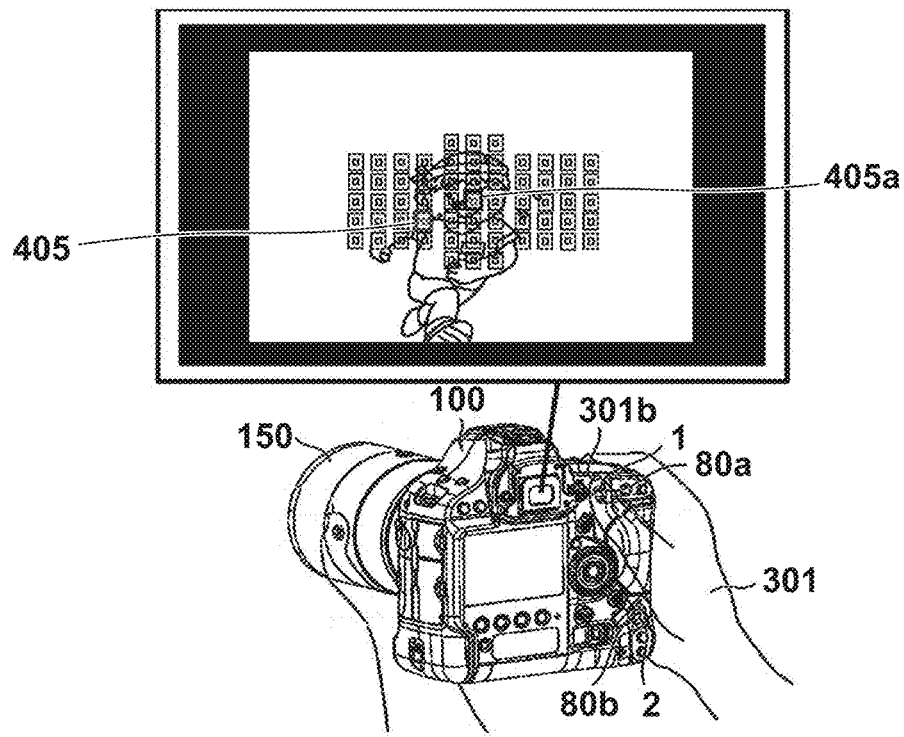
FIGS. 6A to 6D are diagrams for illustrating an example of shooting using the camera shown in FIGS. 1A and 1B.
Figure 6B:
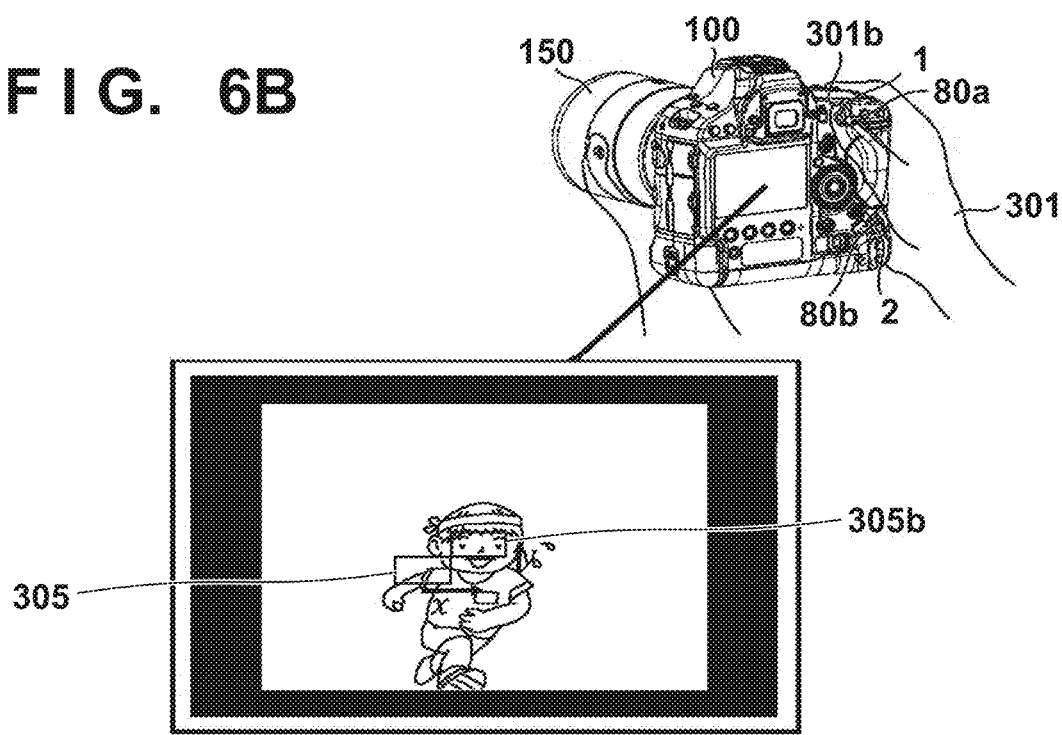
Figure 6C:
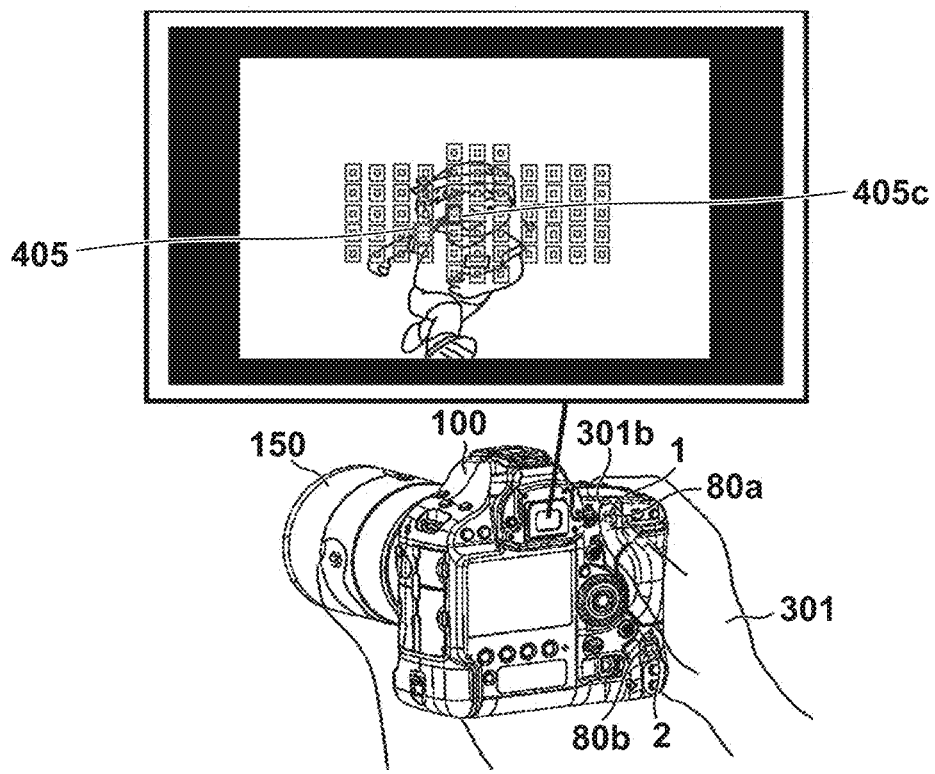
Figure 6D:
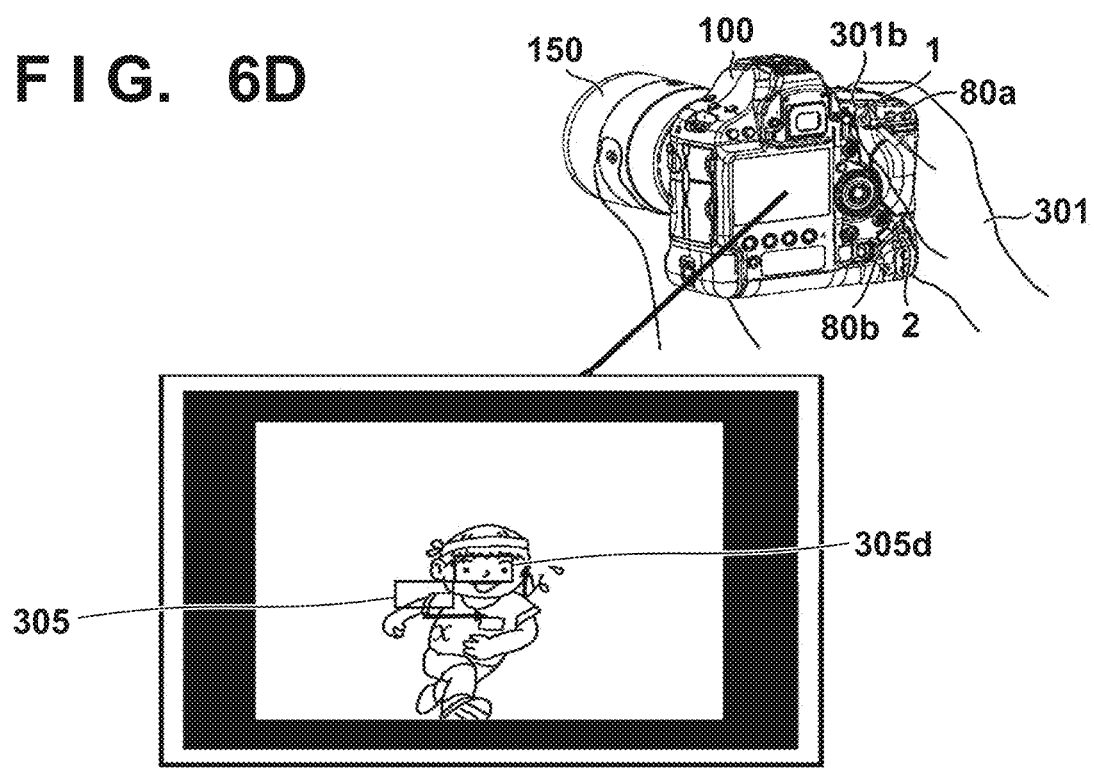

FIGS. 6A to 6D are diagrams for illustrating an example of shooting using the camera shown in FIGS. 1A and 1B. FIGS. 6A and 6C are diagrams showing images that can be seen through the finder during shooting, and FIGS. 6B and 6D are diagrams showing images that are displayed on the display unit 28 during shooting.

Here, it is assumed that the user operates the OTP 1 using a thumb 301b while gripping the first grip portion 101 with a hand 301. Due to the user performing a slide operation with the thumb 301b operating the OTP 1, the system control unit 50 detects a touch-move of the OTP 1.

In FIGS. 6A and 6C, the focal point detection frame 405 is an unmoved focal point detection frame that is viewed through the finder. Also, the focal point detection frames 405a and 405c are moved focal point detection frames. Due to the touch-move, the focal point detection frame 405 moves to the positions of the focal point detection frames 405a and 405c.

In FIGS. 6B and 6D, the focal point detection frame 305 is an unmoved focal point detection frame when displayed on the display unit 28. Also, the focal point detection frames 305b and 305d are moved focal point detection frames. Due to the touch-move, the focal point detection frame 305 moves to the positions of the focal point detection frames 305b and 305d.

Here, FIGS. 6A and 6B show a case in which the movement amounts ($\Delta x$, $\Delta y$) of the focal point detection frames are controlled uniformly with respect to the same operation amount of the OTP. In live view shooting, the selectable range of possible positions of the focal point detection frame is wider compared to that in finder shooting, and fine position adjustment is possible. Accordingly, it is possible to move to an intended position by merely performing control using the movement amount ($\Delta x$, $\Delta y$). In contrast to this, in finder shooting, there is a smaller number of selectable possible positions of the focal point detection frame and the concentration of pre-determined positions is higher compared to live view shooting, and therefore fine position adjustment is not possible. Also, in live view shooting, the user's face is away from the camera, and therefore relatively precise operations are easier to perform, but in finder shooting, the distance between the user's face and the hand and camera is short, and therefore relatively precise operation is difficult to perform. Accordingly, when simple control using the movement amount ($\Delta x$, $\Delta y$) is performed, there is a possibility that movement in an unintended direction or excessive movement will occur, and thus the user will be given a feeling of discomfort.

In view of this, in the present embodiment, as shown in FIGS. 6C and 6D, the movement amount of the focal point detection frame position is controlled such that the focal point detection frame moves less in the case of performing finder shooting than in the case of performing live view shooting, with respect to the same OTP operation amount. In other words, the movement amount of the focal point detection frame position is controlled such that the focal point detection frame position moves more in the case of using live view shooting than in the case of using finder shooting, with respect to the same OTP operation amount. Accordingly, the movement amount of the focal point detection frame is greater in live view shooting when the operation amount is the same first value both when performing live view shooting and when performing finder shooting.

Note that the OTP 1 and the OTP 2 can switch reception of touch and slide operations on and off. Moreover, OTP 1 and OTP 2 can receive touch and slide operations also during an AF operation.

Thus, in the present embodiment, a stroke of a press button is ensured in order to avoid mis-detection during pressing. Then, the selection of the AF position and the start of AF can be performed easily without moving a finger between operation members.

Note that in the above-described example, a case was described in which a selection member (pointing device) is used for selection of the AF position and the start of AF, but the selection member can be applied to selection of an operation relating to image capture, reproduction, and setting in a camera, and the start of the selected operation or confirmation of the selection.

For example, a screen for selecting operations relating to image capture, reproduction, and setting is displayed on the display unit, and a cursor (display body) for selecting image capture, reproduction, and setting on the screen is displayed. Also, the cursor is moved according to the input amount input using the selection member (pointing device), and the operation selected by the cursor according to an operation of the operation member is executed.

Also, as described above, the pointing device is arranged in the operation member. Furthermore, image capture includes an operation of focusing a subject, reproduction includes image sending and image enlargement and reduction, and setting includes the setting of at least the shutter speed, ISO sensitivity, aperture, and exposure correction.

Figure 2:
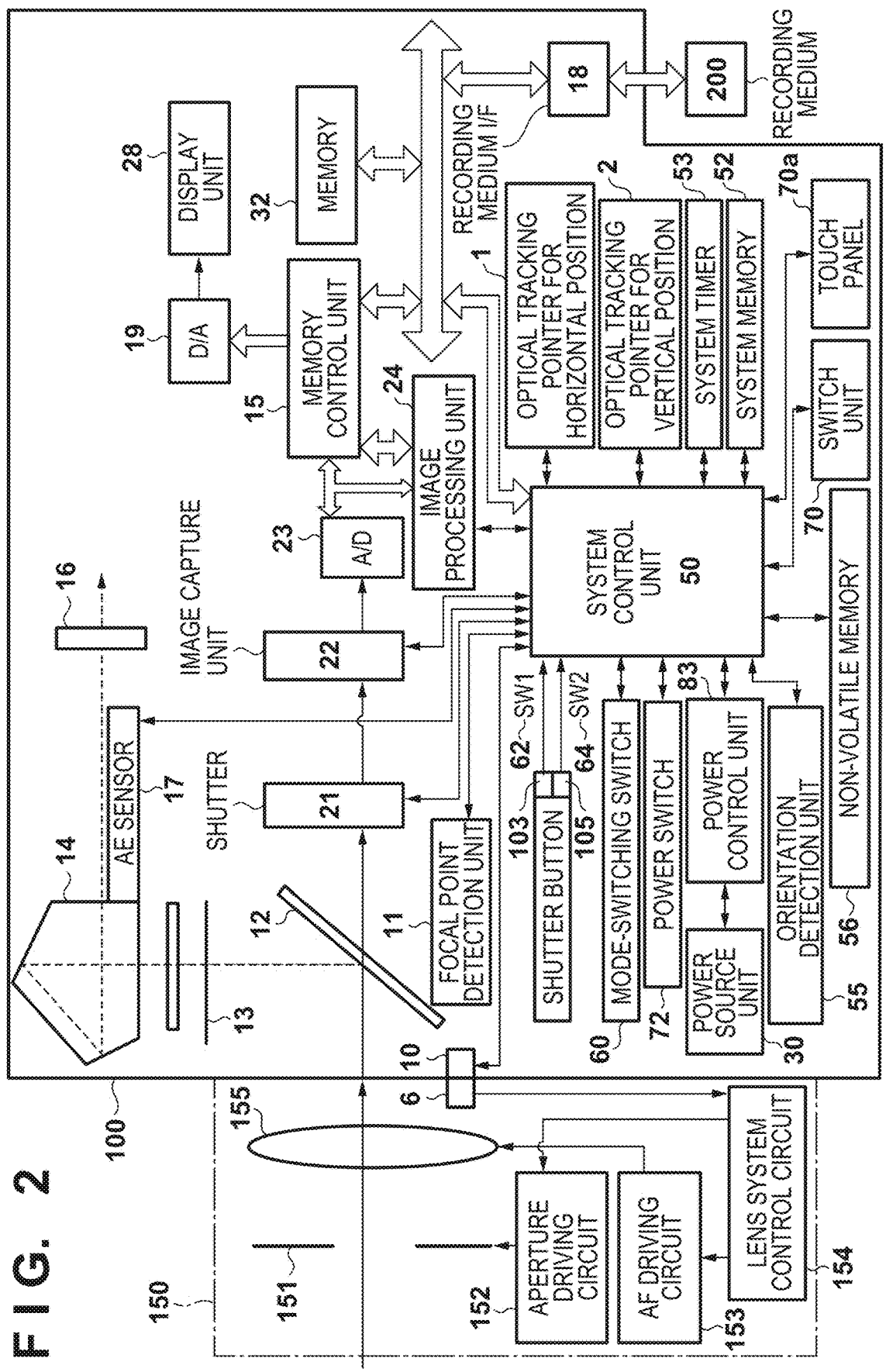
FIG. 2 is a block diagram showing a configuration of a camera of a first embodiment.

FIG. 2 is a block diagram showing a configuration of the camera 100 of the present embodiment.

In FIG. 2, a lens unit 150 is an exchangeable lens unit equipped with a shooting lens. A lens 155 is normally constituted by multiple lenses, but here only one lens is shown to simplify illustration.

A communication terminal 6 is a communication terminal by which the lens unit 150 performs communication with the camera 100, and a communication terminal 10 is a communication terminal by which the camera 100 performs communication with the lens unit 150. The lens unit 150 communicates with a system control unit 50 via the communication terminals 6 and 10. Also, a lens system control circuit 154 inside of the lens unit 150 performs focusing by controlling the aperture 151 via an aperture driving circuit 152 and changing the position of the lens 155 via an AF driving circuit 153. The lens unit 150 is mounted in the camera 100 via a mounting portion provided on the camera 100. Various types of lenses such as single-focus lenses and zoom lenses can be mounted in the lens unit 150.

The AE sensor 17 measures the luminance of a subject image formed on a focusing screen 13 via the lens unit 150 and a quick return mirror 12.

The focal point detection unit 11 (AF sensor) is an AF sensor employing a phase-difference detection scheme, which photoelectrically converts an image incident thereon via the quick return mirror 12 and outputs defocus amount information to the system control unit 50. The system control unit 50 controls the lens unit 150 based on the defocus amount information and thus performs focal point adjustment. The method of AF is not limited to phase-difference AF, and may also be contrast AF. Also, phase-difference AF may be performed based on a defocus amount detected on the image plane of the image capture unit 22, without using the focal point detection unit 11 (image capture plane phase-difference AF).

The quick return mirror 12 (hereinafter, mirror 12) is moved up and down by an actuator (not shown) upon being instructed by the system control unit 50 during exposure, live view shooting, and moving image shooting. The mirror 12 is a mirror for switching the direction of a luminous flux that has entered through the lens 155 between the finder 16 side and the image capture unit 22 side. Although the mirror 12 is arranged so as to reflect and guide the luminous flux to the finder 16 during normal operation, the mirror 12 jumps up and withdraws from the optical path such that the luminous flux is guided to the image capture unit 22 when shooting is performed or during live view display (mirror up). Also, the mirror 12 is a half-mirror whose central portion can transmit some of the light, and allows a portion of the luminous flux to pass through so as to be incident on the focal point detection unit 11 for performing focal point detection.

The user can check the focus state and composition of the optical image of the subject obtained through the lens unit 150 by observing the image formed on a focusing screen 13 via a pentaprism 14 and the finder 16. A focal plane shutter 21 (hereinafter, a shutter 21) controls the exposure time of the image capture unit 22 according to control performed by the system control unit 50.

The image capture unit 22 includes an image sensor constituted by a CCD or CMOS element or the like that converts an optical image into an electrical signal. An A/D converter 23 controls an analog signal output by the image capture unit 22 into a digital signal.

The image processing unit 24 performs predetermined pixel interpolation processing, resizing processing such as compression processing, and color conversion processing on the data from the A/D converter 23 and the data from the memory control unit 15. Also, the image processing unit 24 performs predetermined calculation processing using the image data resulting from shooting and the system control unit 50 performs exposure control and focal point detection control based on the obtained calculation result. Accordingly, TTL (through-the-lens) AF (auto-focus) processing, AE (automatic exposure) processing, and EF (flash pre-emission) processing are performed. The image processing unit 24 further performs predetermined calculation processing using the image data resulting from image capture and performs TTL AWB (auto-white balance) based on the obtained calculation result.

A memory 32 stores image data that was obtained by the image capture unit 22 and converted into digital data by the A/D converter 23, and image data for display on the display unit 28. The memory 32 has a storage capacity that is sufficient for storing a predetermined number of still images, and moving images and audio of a predetermined amount of time. The memory 32 may also be an attachable/detachable storage medium such as a memory card, or a built-in memory.

The display unit 28 is a rear surface monitor such as a liquid crystal apparatus for displaying an image, and is provided on the rear surface of the camera 100 as shown in FIG. 1B. The D/A converter 19 converts the image data for display, which is stored in the memory 32, into an analog signal and supplies the analog signal to the display unit 28. The display unit 28 is not limited to a liquid crystal scheme and may also be a display employing another scheme such as organic EL, as long as it is a display that displays images.

An orientation detection unit 55 is a sensor for detecting the orientation such as the tilt angle of the camera 100. A non-volatile memory 56 is a memory that can be electrically erased and recorded in by the system control unit 50, and for example, an EEPROM or the like is used thereas. Constants, programs, and the like used in the operation of the system control unit 50 are stored in the non-volatile memory 56. A program in this context is a program for executing various types of flowcharts that will be described later in the present embodiment.

The system control unit 50 includes at least one processor and performs overall control of the camera 100. The later-described processing of the present embodiment is executed by executing the programs recorded in the non-volatile memory 56. In a system memory 52, constants, variables, and the like for the operation of the system control unit 50 are temporarily stored, and programs and the like read out from the non-volatile memory 56 are expanded. Moreover, the system control unit 50 also performs display control by controlling the memory 32, the D/A converter 19, the display unit 28, and the like.

A system timer 53 is a clocking unit that counts the amount of time used in various types of control, and the time of a built-in clock. The mode-switching switch 60 switches the operation mode of the system control unit 50 to one of various modes, such as a still image shooting mode and a moving image shooting mode. The still image shooting mode includes a P mode (program AE), an M mode (manual), and the like. Alternatively, after switching to a menu screen using the mode-switching switch 60, another operation member may be used to perform switching to one of the modes included in the menu screen. Similarly, multiple modes may also be included in the moving image shooting mode. In the M mode, a user can set the aperture value, shutter speed, and ISO sensitivity, and shooting is performed using an exposure intended by the user.

The first shutter switch 62 is switched on by a so-called half-press (shooting preparation instruction) during operation of the shutter buttons 103 and 105 provided on the camera 100, and generates a first shutter switch signal SW1. Shooting preparation operations such as AF (auto-focus) processing, AE (automatic exposure) processing, AWB (auto white balance) processing, and EF (flash pre-emission) processing are started by the first shutter switch signal SW1. Metering by the AE sensor 17 is also performed. A second shutter switch 64 is switched on by a so-called full press (shooting instruction) after the operation of the shutter buttons 103 and 105 is complete, and generates a second shutter switch signal SW2. The system control unit 50 starts operations of a series of shooting processes from signal readout from the image capture unit 22 to writing the image data in the recording medium 200, using the second shutter switch signal SW2.

A power control unit 83 is constituted by a battery detection circuit, a DC-DC converter, a switch circuit for switching blocks that are to receive power, and the like, and performs detection of whether or not a battery is mounted, the type of the battery, and the remaining amount of the battery. Also, the power control unit 83 controls the DC-DC converter based on the detection results and instructions from the system control unit 50, and supplies a needed voltage to units including the recording medium 200 for a needed amount of time. The power switch 72 is a switch for switching the power of the camera 100 on and off.

A power source unit 30 is composed of a primary battery such as an alkali battery or a lithium battery, a secondary battery such as a NiCd battery, a NiMH battery, or a Li ion battery, an AC adapter, or the like. A recording medium I/F 18 is an interface with the recording medium 200, which is a memory card, a hard disk, or the like. The recording medium 200 is a recording medium such as a memory card for storing shot images, and is constituted by a semiconductor memory, a magnetic disk, and the like.

Note that a touch panel 70a that can detect contact with the display unit 28 is included as one operation unit 70. The touch panel 70a and the display unit 28 can be formed in one piece. For example, the touch panel 70a is formed such that the transmission rate of the light does not hinder display of the display unit 28, and the touch panel 70a is attached to the upper layer of the display surface of the display unit 28. Also, the input coordinates of the touch panel and the display coordinates on the display unit 28 are associated with each other. Accordingly, it is possible to form a GUI (graphic user interface) that makes it seem as if the user is directly operating a screen displayed on the display unit 28. The system control unit 50 can detect the following states or operations on the touch panel 70a.

A finger or pen that was not touching the touch panel 70a newly touches the touch panel 70a. In other words, the start of touch (hereinafter referred to as a "touch-down").

A state in which the touch panel 70a is being touched with a finger or a pen (hereinafter referred to as a "touch-on").

A finger or pen that is touching the touch panel 70a is moved (hereinafter referred to as a "touch-move").

A finger or a pen that was touching the touch panel 70a is removed from the touch panel 70a. In other words, the end of touch (hereinafter referred to as a "touch-up").

Nothing is touching the touch panel 70a (hereinafter referred to as a "touch-off").

When a touch-down is detected, a touch-on is also detected at the same time. After a touch-down, a touch-on normally continues to be detected as long as no touch-up is detected. A touch-move is detected also in a state in which a touch-on has been detected. Even if a touch-on is detected, no touch-move is detected if the touch position does not move. After it is detected that all of the fingers and pens that are touching have performed a touch-up, a touch-off is detected. Furthermore, it is also possible to detect a pressing state in which at least a predetermined pressure is applied to the touch panel 70a in the touch-on state.

Via an internal bus, the system control unit 50 is notified of these operation states and the position coordinates touched by the finger or pen on the touch panel 70a, the system control unit 50 determines what kind of operation was performed on the touch panel based on the notified information. Regarding touch-move, the movement direction of the pen or finger that moves on the touch panel can be determined for the vertical component and the horizontal component on the touch panel based on the change in the position coordinates. Also, when a touch-down, a predetermined touch-move, and then a touch-up are performed on a touch panel, it is assumed that a stroke is drawn. The operation of rapidly drawing a stroke is called a "flick". A flick is an operation in which a finger is moved rapidly a certain distance while touching the touch panel and is then removed from the touch panel, and in other words, it is an operation of rapidly tracing such that the finger flicks over the touch panel. It is possible to determine that a flick was performed when a touch-move performed for a predetermined distance or more at a predetermined speed or more is detected and a touch-up is detected immediately thereafter. If it is detected that a touch-move was performed for a predetermined distance or more at less than a predetermined speed, it is assumed that a drag is detected.

A touch panel employing any of various schemes, such as a resistive film scheme, an electrostatic capacity scheme, a surface elasticity wave scheme, an infrared light scheme, an electromagnetic inductance scheme, or an optical sensor scheme, may also be used as the touch panel 70a. According to the scheme, some schemes detect that a touch was performed by detecting contact with the touch panel, and some schemes detect that a touch was performed by detecting the approach of a finger or pen to the touch panel, but any scheme may be employed.

The system control unit 50 detects eight directions, namely up, down, left, right, upper left, lower left, upper right, and lower right as the directions of movement (hereinafter referred to as movement directions) in a slide operation based on the output information of the OTP 1 and the OTP 2. Also, the system control unit 50 calculates the amount of movement in the slide operation using two-dimensional directions in an x-axis direction and a y-axis direction (hereinafter referred to as movement amount (x, y)) based on the output information of the OTP 1 and the OTP 2. The system control unit 50 can further detect the following states or operations on the OTP 1 and the OTP 2.

A finger that was not touching the OTP 1 or the OTP 2 newly touches the OTP 1 or the OTP 2. In other words, the start of touch (hereinafter referred to as a "touch-down").

A state in which the OTP 1 or the OTP 2 is being touched by a finger (hereinafter referred to as a "touch-on").

A finger is moved while touching the OTP 1 or the OTP 2 (hereinafter referred to as a "touch-move").

A finger that was touching the OTP 1 or the OTP 2 is removed from the OTP 1 or the OTP 2. In other words, the end of touch (hereinafter referred to as a "touch-up").

Nothing is touching the OTP 1 or the OTP 2 (hereinafter referred to as a "touch-off").

When a touch-down is detected, a touch-on is also detected at the same time. After a touch-down, a touch-on normally continues to be detected as long as no touch-up is detected. A touch-move is detected also in a state in which a touch-on is detected. Even if a touch-down is detected, a touch-move is not detected if the movement amount (x, y) is 0. After it is detected that all of the fingers and pens that are touching have performed a touch-up, a touch-off is detected.

The system control unit 50 determines what kind of operation (touch operation) was performed on the OTP 1 or the OTP 2 based on the operation state, movement direction, and movement amount (x, y). Regarding a touch-move, eight directions, namely up, down, left, right, upper left, lower left, upper right, and lower right, or a two-dimensional movement direction in the x-axis direction and the y-axis direction is detected on the OTP 1 or the OTP 2. The system control unit 50 determines that a slide operation has been performed when movement in any of the eight directions or movement in one or both of the two-dimensional directions, namely the x-axis direction and the y-axis direction, is detected. When an operation is performed in which a finger touches the OTP 1 or the OTP 2 and the touch is removed within a predetermined amount of time without performing a slide operation, it is determined that a tap operation was performed.

In the present embodiment, the OTP 1 and the OTP 2 are touch sensors employing an infrared light scheme. However, the OTP 1 and the OTP 2 may also be sensors employing another scheme, such as a resistive film scheme, a surface elasticity wave scheme, an electrostatic capacity scheme, an electromagnetic induction scheme, an image recognition scheme, or an optical sensor scheme.

Figure 3:
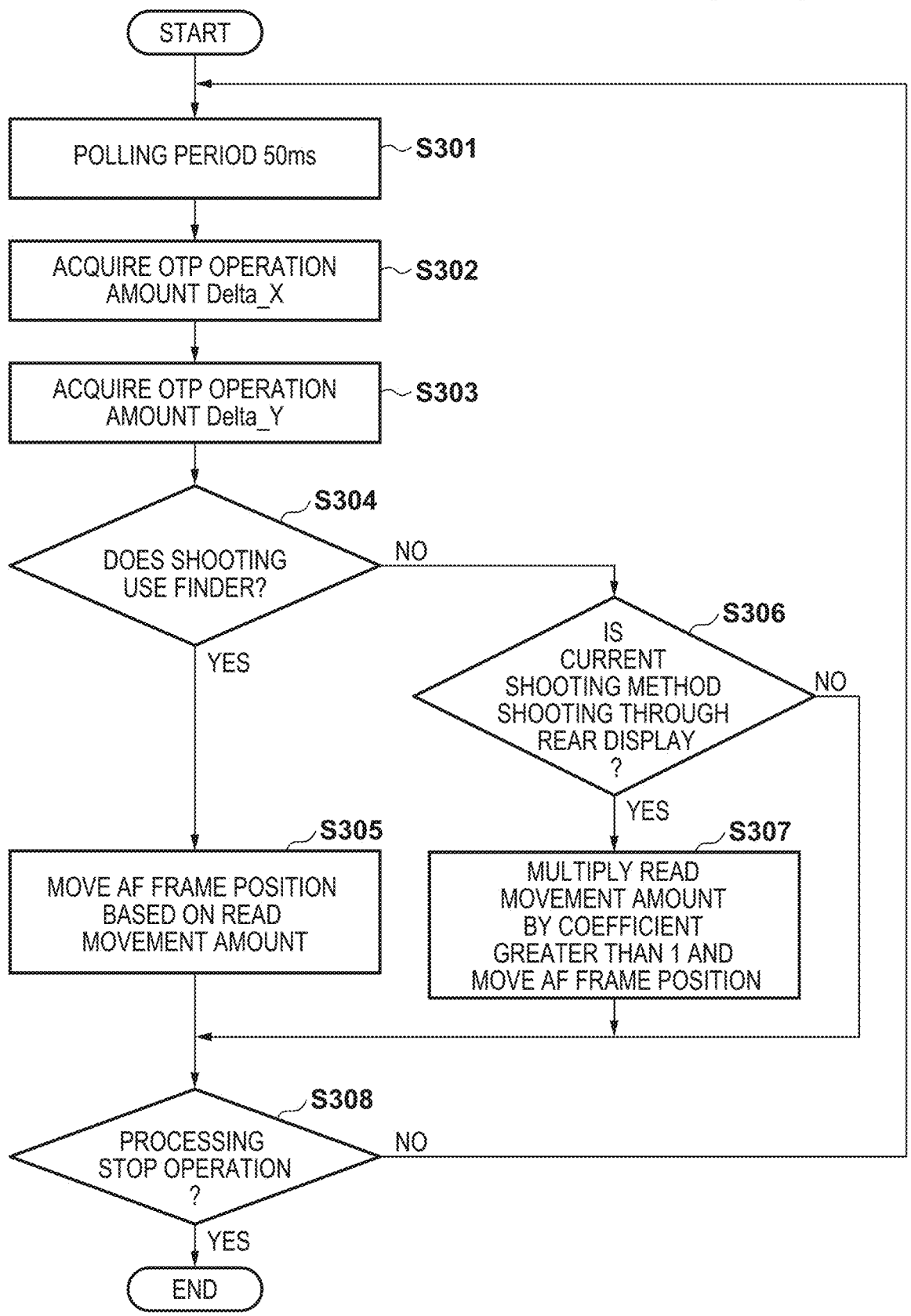
FIG. 3 is a flowchart showing an operation of moving a focal point detection frame position according to a first embodiment.

Next, a movement operation of a focal point detection frame position on the camera 100 of the present embodiment configured as described above will be described. FIG. 3 is a flowchart showing a movement operation of a focal point detection frame position according to the present embodiment.

In step S301, the system control unit 50 checks the operation input of the OTPs (optical tracking pointers OTP 1 and OTP 2) with a polling period of 50 ms. In each polling period, an operation amount in the X direction is acquired in step S302, and an operation amount in the Y direction is acquired in step S303.

In step S304, based on whether or not an LV button 78 is on or off, the system control unit 50 checks whether or not the current shooting method is shooting using the finder (finder shooting). Then, if the current shooting method is finder shooting, the processing advances to step S305, and the movement amount of the focal point detection frame position is calculated according to the operation amounts obtained in step S302 and step S303.

In step S304, if the current shooting method is not finder shooting, it is checked in step S306 whether or not the current shooting method is shooting through rear panel display (live view shooting). Then, if the current shooting method is live view shooting, the processing advances to step S307, and the operation amounts obtained in step S302 and step S303 a multiplied by a coefficient greater than 1 to calculate the movement amount of the focal point detection frame position such that the focal point detection frame position moves a greater amount than in the case of finder shooting with respect to the same operation amount of the OTP.

Note that in step S306, if the current shooting method is not live view shooting either, the processing advances to step S308.

In step S308, it is determined whether or not reception of operations of the OTPs is to be stopped, and if it is to be stopped, the processing of this flow is ended, and if not, the processing returns to step S301.

As described above, in the first embodiment, in live view shooting, in which the user can move the focal point detection frame position while checking the movement of the user's finger and can perform a precise operation, the movement amount of the focal point detection frame position with respect to the operation amount of the OTP is made greater than that in the case of finder shooting, in which visual checking is not possible. Accordingly, it is possible to obtain movement sensitivities for the focal point detection frame position that are suitable for finder shooting and live view shooting, with respect to an operation amount of the OTP, and in both shooting methods, it is possible to realize preferable operability when moving the focal point detection frame position.

Second Embodiment

In the second embodiment, the configuration of the camera 100 is the same as that in the first embodiment, and only the movement operation of the focal point detection frame position is different. For this reason, description of the configuration of the camera 100 is omitted here, and the movement operation of the focal point detection frame position will be described.

Figure 4:
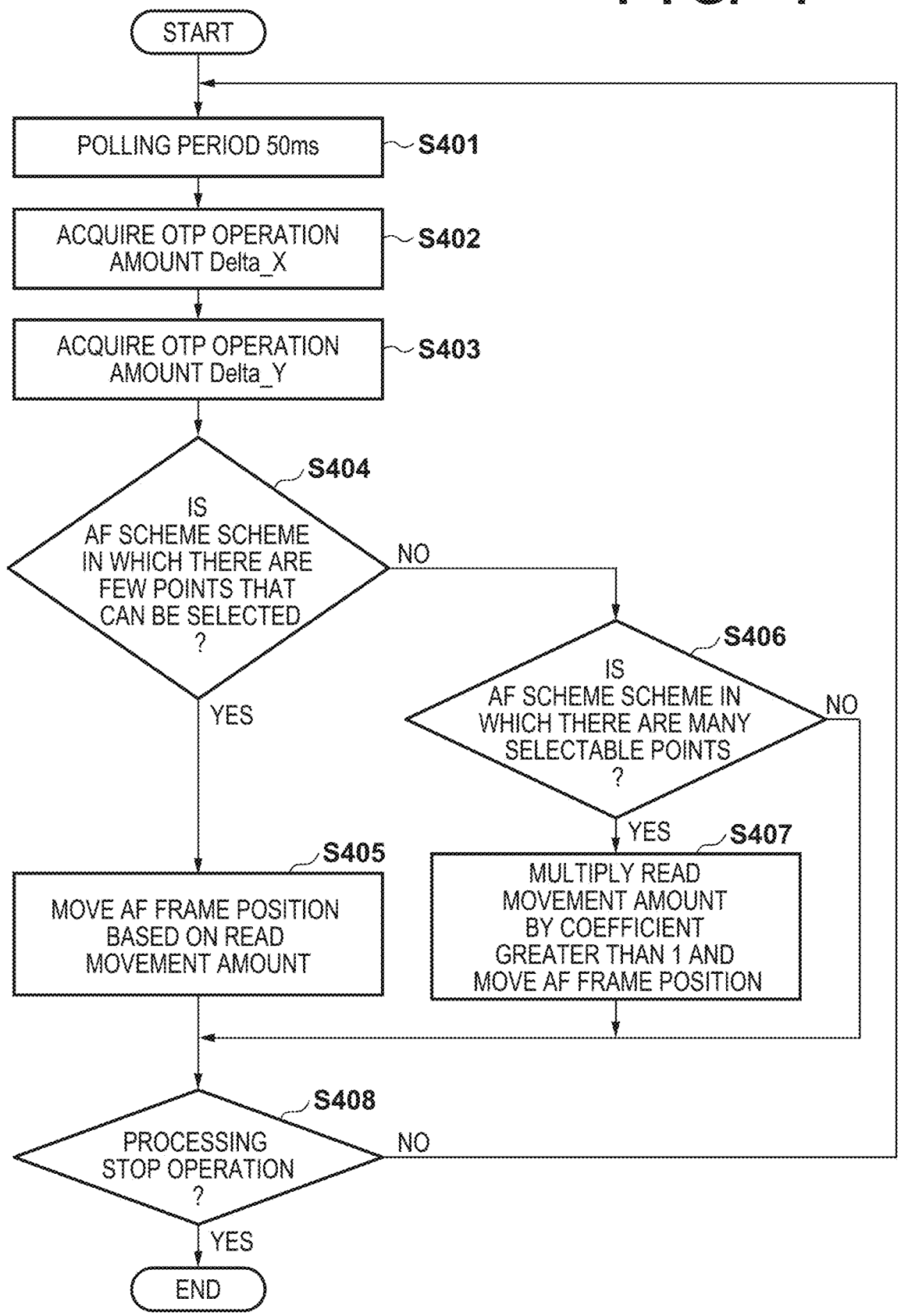
FIG. 4 is a flowchart showing an operation of moving a focal point detection frame position according to a second embodiment.

FIG. 4 is a flowchart showing an operation of moving a focal point detection frame position according to the second embodiment.

In step S401, the system control unit 50 checks the operation inputs of the OTPs with a polling period of 50 ms. In each polling period, an operation amount in the X direction is acquired in step S402, and an operation amount in the Y direction is acquired in step S403.

In step S404, the system control unit 50 checks whether or not the current AF (autofocus) scheme is a scheme in which there are few points that can be selected as the focal point detection frame position based on the state of the mode-switching switch 60. Then, if the AF scheme is a scheme in which there are relatively few selectable points, the processing advances to step S405, and the movement amount of the focal point detection frame position is calculated according to the operation amounts obtained in step S402 and step S403.

In step S404, if the current AF scheme is not a scheme in which there are few selectable points, it is checked in step S406 whether or not the AF scheme is a scheme in which there are many selectable points. Then, if the AF scheme is a scheme in which is there are many selectable points, the processing advances to step S407, and the operation amounts obtained in step S402 and step S403 is multiplied by a coefficient greater than 1 to calculate the movement amount of the focal point detection frame position such that the focal point detection frame position moves a greater amount with respect to the same operation of the OTP than in a scheme in which there are few selectable points.

Note that in step S406, if the current AF scheme is also not a scheme in which there are many selectable points, the processing advances to step S408.

In step S408, it is determined whether or not reception of operations of the OTPs is to be stopped, and if it is to be stopped, the processing of this flow is ended, and if not, the processing returns to step S401.

As described above, in the second embodiment, in an AF scheme in which there are relatively many selectable points for the focal point detection frame position, the movement amount of the focal point detection frame position with respect to the operation amount of the OTP is made greater than that in the case of an AF scheme in which there are relatively few selectable points. Accordingly, it is possible to obtain movement sensitivities of the focal point detection frame position that are suitable for an AF scheme in which there are many selectable points for the focal point detection frame position and an AF scheme in which there are few selectable points, with respect to the OTP operation amount. Also, it is possible to realize favorable operability when moving the focal point detection frame position in any AF scheme.

Third Embodiment

In the third embodiment as well, the configuration of the camera 100 is the same as that in the first embodiment, and only the movement operation of the focal point detection frame position is different. For this reason, description of the configuration of the camera 100 is omitted here, and the movement operation of the focal point detection frame position will be described.

Figure 5:
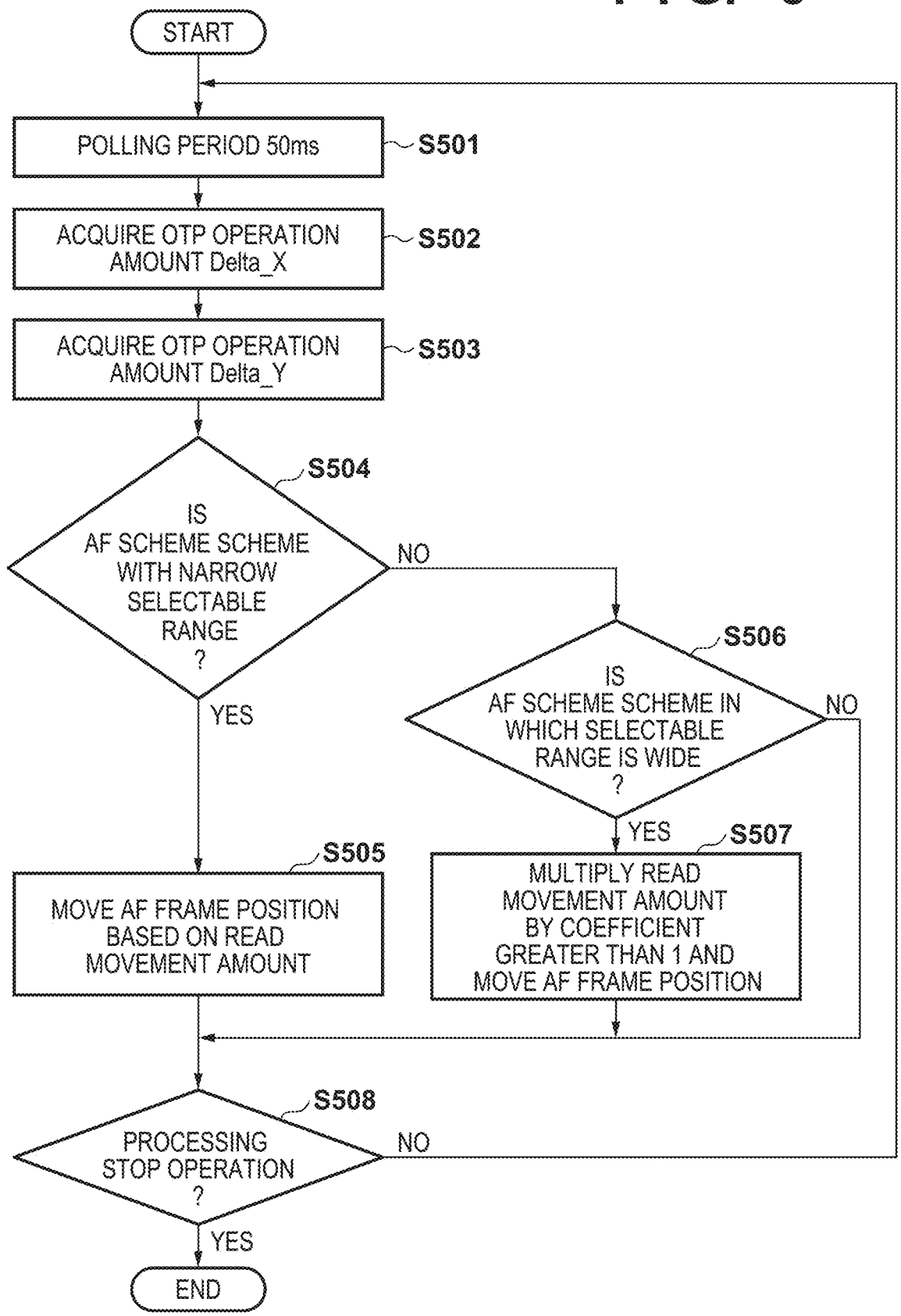
FIG. 5 is a flowchart showing an operation of moving a focal point detection frame position according to a third embodiment.

FIG. 5 is a flowchart showing an operation of moving a focal point detection frame position according to the third embodiment.

In step S501, the system control unit 50 checks the operation inputs of the OTPs with a polling period of 50 ms. In each polling period, an operation amount in the X direction is acquired in step S502, and an operation amount in the Y direction is acquired in step S503.

In step S504, the system control unit 50 checks whether or not the current AF scheme is a scheme with a narrow selectable range of the focal point detection frame position, based on the state of the mode-switching switch 60. Then, if the AF scheme is a scheme in which the selectable range is narrow, the processing advances to step S505, and the movement amount of the focal point detection frame position is calculated according to the operation amounts obtained in step S502 and step S503.

In step S504, if the current AF scheme is not a scheme in which the selectable range is narrow, it is checked in step S506 whether or not the AF scheme is a scheme in which the selectable range of the focal point detection frame position is wide. Then, if the AF scheme is a scheme in which the selectable range is wide, the processing advances to step S507, and the operation amounts obtained in step S502 and step S503 are multiplied by a coefficient greater than 1 to calculate movement amounts of the focal point detection frame position such that the focal point detection frame position moves a greater amount with respect to the same OTP operation amount than in a scheme in which the selectable range is narrow.

Note that in step S506, if the current AF scheme is also not a scheme in which the selectable range is wide, the processing advances to step S508.

In step S508, it is determined whether or not reception of operations of the OTPs is to be stopped, and if it is to be stopped, the processing of this flow is ended, and if not, the processing returns to step S401.

As described above, in the third embodiment, in an AF scheme in which the selectable range of the focal point detection frame position is relatively wide, the movement amount of the focal point detection frame position with respect to the OTP operation amount is made greater than that in the case of an AF scheme in which the selectable range is relatively narrow. Accordingly, it is possible to obtain movement sensitivities of the focal point detection frame position that are suitable for an AF method in which the selectable range of the focal point detection frame position is wide and an AF scheme in which the selectable range is narrow, with respect to the OTP operation amount. Also, it is possible to realize favorable operability when moving the focal point detection frame position in any AF scheme.

Note that in the above-described embodiment, three cases, namely a case of finder shooting and live view shooting, a case of AF schemes with different numbers of arrangements of the focal point detection region, and a case of AF schemes with different numbers of arrangements of the focal point detection region, were described as examples on changing the movement amount of the focal point detection region with respect to an OTP operation amount, according to the shooting state. However, the present invention can be applied also to a shooting state other than these cases. For example, if a detection means for detecting a subject based on an image signal is included and multiple subjects are detected, the movement amount of the focal point detection region with respect to the OTP operation amount may also be made greater when a distance between subjects is greater than a certain distance. Also, two autofocus modes, which are a servo mode in which an autofocus operation is continuously performed, and a one-shot mode in which an operation is completed with one auto-focus operation, are included, and when the servo mode is used, the movement amount of the focal point detection region with respect to the OTP operation amount may also be made greater than when the one-shot mode is used.

Furthermore, in the above-described embodiment, OTPs were described as examples of operation members for moving a focal point detection region, but the focal point detection region may also be moved using the touch panel 70a instead of the OTPs. In this case as well, it is possible to perform control that is the same as the control performed using the OTPs shown in the first to third embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072164, filed Apr. 4, 2019, and Japanese Patent Application No. 2019-239285, filed Dec. 27, 2019, which are hereby incorporated by reference herein in their entirety.

What is claimed is:

1. An image capture apparatus comprising:
an operation device according to which a focal point detection region on a screen can be moved through a movement operation performed by a user, the operation device being able to be operated by a thumb of a hand holding a first grip portion which is arranged along a first side of a first surface of the image capture apparatus;
a finder according to which the user can observe a subject image by looking into the finder;
a display device for displaying the subject image, the display device being provided on a rear surface of the image capture apparatus; and
at least one processor or circuit configured to function as:
a control unit configured to perform control such that a movement amount of the focal point detection region on the screen with respect to a first operation amount of the operation device in a case of performing shooting while viewing the display device is greater than a movement amount of the focal point detection region on the screen with respect to the first operation amount of the operation device in a case of performing shooting while viewing the finder,
wherein the operation device is an optical tracking pointer which is able to detect, by employing infrared light scheme, a touch operation and a slide operation of a finger to the optical tracking pointer and the optical tracking pointer is incorporated in an Auto Focus (AF) ON button for instructing to start an AF operation, and
wherein the operation device is arranged in between the display device and the first grip portion on the rear surface of the image capture apparatus.

2. The image capture apparatus according to claim 1, wherein based on a state of a switch for performing live view, the control unit determines whether shooting is to be performed while viewing the display device or shooting is to be performed while viewing the finder.

3. The image capture apparatus according to claim 1, wherein the optical tracking pointer is able to receive user's operation during an AF operation.

4. The image capture apparatus according to claim 1, wherein the operation device includes an optical tracking pointer used for horizontal position shooting and an optical tracking pointer used for vertical position shooting.

5. The image capture apparatus according to claim 1, wherein the control unit calculates moving direction of the focal point detection region in eight directions including down, left, right, upper left, lower left, upper right, and lower right based on output information of the operation device, and the control unit calculates moving amount of the focal point detection region in two-dimensional directions based on the output information of the operation device.

6. An image capture apparatus control method for controlling an image capture apparatus including an operation device according to which a focal point detection region on a screen can be moved through a movement operation performed by a user, the operation device being able to be operated by a thumb of a hand holding a first grip portion which is arranged along a first side of a first surface of the image capture apparatus, a finder according to which the user can observe a subject image by looking into the finder, and a display device for displaying the subject image, the display device being provided on a rear surface of the image capture apparatus, the method comprising:

performing control such that a movement amount of the focal point detection region on the screen with respect to a first operation amount of the operation device in a case of performing shooting while viewing the display device is greater than a movement amount of the focal point detection region on the screen with respect to the first operation amount of the operation device in a case of performing shooting while viewing the finder, wherein the operation device is an optical tracking pointer which is able to detect, by employing infrared light scheme, a touch operation and a slide operation of a finger to the optical tracking pointer and the optical tracking pointer is incorporated in an Auto Focus (AF) ON button for instructing to start an AF operation, and wherein the operation device is arranged in between the display device and the first grip portion on the rear surface of the image capture apparatus.

7. A non-transitory computer-readable storage medium storing a program for causing a computer to execute a control method, for controlling an image capture apparatus including an operation device according to which a focal point detection region on a screen can be moved through a movement operation performed by a user, the operation device being able to be operated by a thumb of a hand holding a first grip portion which is arranged along a first side of a first surface of the image capture apparatus, a finder according to which the user can observe a subject image by looking into the finder, and a display device for displaying the subject image, the display device being provided on a rear surface of the image capture apparatus, the method comprising:

performing control such that a movement amount of the focal point detection region on the screen with respect to a first operation amount of the operation device in a case of performing shooting while viewing the display device is greater than a movement amount of the focal point detection region on the screen with respect to the first operation amount of the operation device in a case of performing shooting while viewing the finder, wherein the operation device is an optical tracking pointer which is able to detect, by employing infrared light scheme, a touch operation and a slide operation of a finger to the optical tracking pointer and the optical tracking pointer is incorporated in an Auto Focus (AF) ON button for instructing to start an AF operation, and wherein the operation device is arranged in between the display device and the first grip portion on the rear surface of the image capture apparatus.

\* \* \* \* \*